(12) United States Patent
Anderson et al.

(10) Patent No.: US 6,425,286 B1
(45) Date of Patent: Jul. 30, 2002

(54) ELECTRO-OPTIC ICE DETECTION DEVICE

(76) Inventors: Mark Anderson, 10401 Honda Dr., Littleton, CO (US) 80127; Larry Meiners, 1935 Cedar Dr., Rapid City, SD (US) 57702

( * ) Notice: Subject to any disclaimer, the term of this patent is extended or adjusted under 35 U.S.C. 154(b) by 0 days.

(21) Appl. No.: 09/437,290

(22) Filed: Nov. 9, 1999

(51) Int. Cl.⁷ ................................................ G06W 1/00
(52) U.S. Cl. .................................................. 73/170.26
(58) Field of Search ............................. 73/170.26, 293, 73/149, 705; 340/573, 583, 580, 962; 356/355, 338, 382; 250/559.41, 226, 221; 244/134 F

(56) References Cited

U.S. PATENT DOCUMENTS

| | | | | |
|---|---|---|---|---|
| 4,578,959 A | * | 4/1986 | Alsenz | 62/140 |
| 4,782,331 A | * | 11/1988 | Martens | |
| 4,797,660 A | * | 1/1989 | Rein, Jr. | |
| 4,803,470 A | * | 2/1989 | Fineman | |
| 5,296,853 A | * | 3/1994 | Federow et al. | 340/962 |
| 5,354,015 A | * | 10/1994 | Meador | |
| 5,396,079 A | * | 3/1995 | Evers et al. | |
| 5,507,183 A | * | 4/1996 | Larue et al. | |
| 5,596,320 A | * | 1/1997 | Barnes | |
| 5,671,606 A | * | 9/1997 | Schroeder et al. | 62/137 |
| 5,695,155 A | * | 12/1997 | Macdonald et al. | |

* cited by examiner

*Primary Examiner*—William Oen
(74) *Attorney, Agent, or Firm*—Ancel W. Lewis, Jr.

(57) ABSTRACT

The present invention is an optical ice detection probe capable of detecting the presence, thickness and continued buildup of ice. The invention works by attaching the probe to the external surface of an airplane such as the wing, fuselage or empannage. The probe has a recessed surface, which is mounted to face directly into the airflow. One or more beams are passed over and parallel to the recessed surface. These beams can be of any useful wavelength, however for best results visible, infrared or ultraviolet beams should be used. Ice on the recessed surface interrupts the beams thereby indicating the presence of ice. If two or more beams are used, then each beam emitter is paired with a beam detector and the corresponding beam detector only detects the beam from that emitter. This can be accomplished by numerous methods. For example, powering each beam emitter alternately and sampling the output of the corresponding detector, electronically modulating the beam to a specific frequency with corresponding detectors designed to respond to the specific frequency or using an optical filter that passes only specific wavelengths.

22 Claims, 3 Drawing Sheets

ELECTRO-OPTIC ICE DETECTION DEVICE

BACKGROUND OF THE INVENTION

1. Field of the Invention

The present invention relates to the field of ice detection and more particularly to a new and improved device for optically detecting the presence and thickness of ice.

2. Discussion of the Prior Art

Ice poses a significant problem in the transportation industry. Throughout the years, numerous accidents have been attributed to ice and ice buildup. With respect to aviation, ice has the ability to compromise airworthiness by changing the flight characteristics and the weight of an airplane, thereby increasing the risk of flying. Often pilots are not aware of the onset of airframe icing until the safety of the flight is in jeopardy. Thus, an icing detection system that alerts pilots to the initial onset of icing is desirable. Furthermore, the optimal use of in-flight de-icing equipment such as aircraft de-icing boots often depends upon the depth of ice buildup. Thus, the need exists for a reliable and affordable means to detect ice and to assess the buildup of ice depth.

Several devices for optical ice detection have been previously disclosed. The first incorporates a sensor at one end of an optical channel comprised of a fiber optic bundle. The fiber optic bundle totally reflects light internally when no ice is present, but when water or ice is present, some of the incident light is refracted externally. Another device attempts to detect ice and ice depth by using two or more optical fibers to transmit light and receive reflected light. The device relies on reflections from the surface at the ice/air interface to assess the presence and depth of ice. Other devices use single optical fibers to detect the presence of ice through the scattering or reflection of light at the end of the optical fiber. These devices suffer from serious technical limitations due to roughness of the ice surface and imperfections in the ice scattering the light.

SUMMARY OF THE INVENTION

The present invention is an optical ice detection probe capable of detecting the presence, thickness and continued buildup of ice. The invention works by attaching the probe to the external surface of an airplane such as the wing, fuselage or empannage. The probe has a recessed surface, and the shape of the probe permits ice to build up on the recessed surface. Currently, the shape of the probe is cylindrical however other shapes are possible. At least one beam is passed over and parallel to the recessed surface. Beam detectors are used to monitor the beam after the beam has crossed the recessed surface. As ice develops on the recessed surface, ice will obstruct the beam detector, such that the beam will no longer be detectable by the beam detector. For best results, the recessed surface is mounted directly in the airflow, preferably in the laminar flow. The length of the recessed surface is set to optimize the system for the specific application involved. The beams can be of any useful wavelength, however for best results visible, infrared or ultraviolet beams should be used.

If two or more beams are used, then each beam emitter is paired with a beam detector and the corresponding beam detector only detects the beam from that emitter. This can be accomplished by numerous methods. For example, powering each beam emitter alternately and sampling the output of the corresponding detector, electronically modulating the beam to a specific frequency with corresponding detectors designed to respond to the specific frequency or using an optical filter that passes only specific wavelengths. Additionally, placing an optical filter in front of the detector filters out ambient light. The invention also incorporates redundant temperature sensors to measure the temperature of the probe, and a probe heater to melt accumulated ice to assess continued ice accumulation.

In the preferred embodiment of the invention, two or more beams are used, and the beams are all at the same height with respect to the recessed surface, typically 0.02 inches above the recessed surface. The primary purpose for using two or more beams is for contamination rejection. In the event that one beam is interrupted due to contamination, the other beams are still available for ice detection. In the second preferred embodiment, two or more beams will be positioned at sequential distances from the recessed surface. The beams are positioned such that one beam will be closely parallel and above the recessed surface to indicate the onset of icing, while the other beams will be positioned at subsequent distances from the recessed surface to assess the continued buildup of ice. In a third preferred embodiment, two or more beams will be positioned at sequential distances from the recessed surface and at each sequential position, two or more beams will be used for contamination rejection. It is anticipated that this device will continuously measure the temperature of the probe.

If the temperature of the probe is greater than 10 degrees Celsius and at least one beam is interrupted for greater than 60 seconds then the Probe Inspect LED on the cockpit display unit is activated indicating the possibility of probe contamination. If the temperature is below 10 degrees Celsius, and only one beam is interrupted for greater than 60 seconds, then the Probe Inspect LED on the cockpit display unit is activated indicating the possibility of contamination. If the temperature is below 10 degrees Celsius, and more than one beam is interrupted for greater than 10 seconds, the Ice Warning LED is activated and the Probe Heater is activated. The probe heater will continue to heat the probe until 10 seconds after at least one beam detector is cleared. Then the device is reset to continue monitoring for ice. By counting the number of probe heating cycles the device can provide an assessment of total ice depth, and by measuring the frequency of heating cycles the device can provide a rate of total ice depth formation. With respect to the second and the third preferred embodiment, the probe heater will not activate until the beam the furthest from the recessed surface is blocked. The probe heater will then melt the ice until at least one beam is clear and the device is then reset to continue monitoring for ice.

This device distinguishes between ice and fluid by optical intensity fluctuations and attenuation due to thickness. The presence of fluid on the recessed surface will cause the beam strength and therefore the detector output to fluctuate rapidly. The electromagnetic wavelength of the beams is selected such that a thin layer of ice, water or de-icing/anti-icing fluid on the walls of the recess surface will not produce sufficient optical attenuation to trigger ice or contamination indications. The beam wavelength is such that most of the recessed surface must be filled by ice to trigger warning indications. This typically requires electromagnetic wavelengths above one micron.

It is therefore an object of the invention to provide a simple optical detection system that can detect the presence and thickness of ice. It is another object of the invention to detect the presence and thickness of ice irrespective of the roughness of the formed ice or imperfections in the ice scattering the light. It is an object of this invention to distinguish between fluid and ice. Finally, it is an object of the invention to determine when ice thickness has reached a critical depth.

These and other objects of the present invention will become apparent to those familiar with optical ice detection, and more particularly defined by the appended claims. It being understood that changes in the precise embodiment to the disclosed invention are meant to be included as coming within the scope of the claims, except as insofar as they may be precluded by the prior art.

BRIEF DESCRIPTION OF THE DRAWINGS

The accompanying drawings illustrate the complete preferred embodiments of the present invention according to the best modes presently devised for practical application of the principles thereof, and in which.

DETAILED DESCRIPTION OF THE INVENTION

Figure 1:
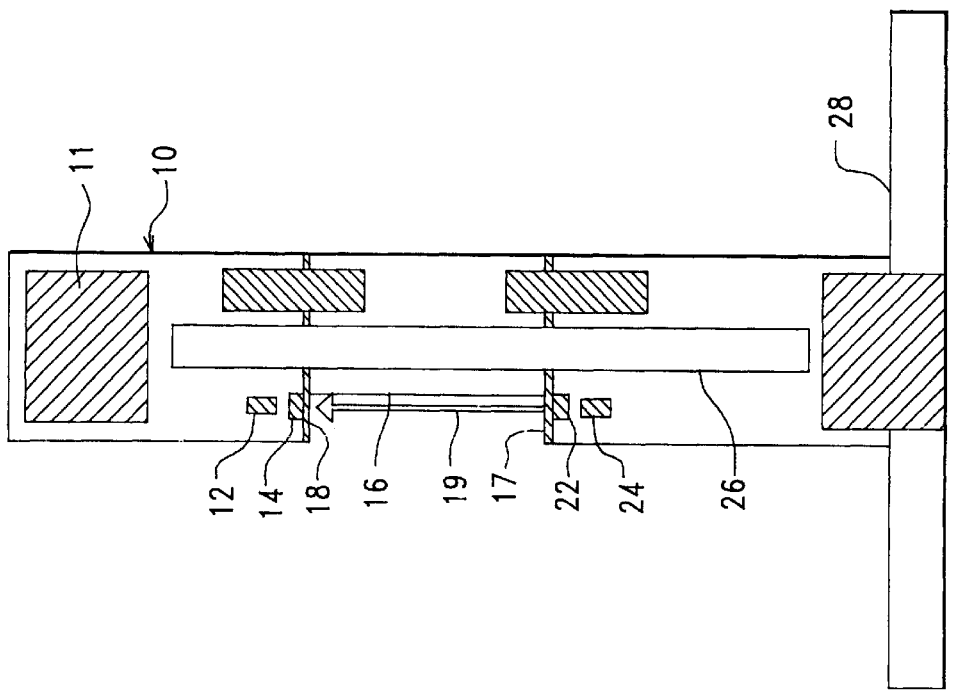
FIG. 1 is a front view of the Ice Detection Probe.

In the drawings like reference numerals throughout the various figures refer to like elements. The invention at hand will work with all beams, however for the best result a beam of infrared light with a wavelength in excess of 1 micron should be used and will be used throughout this detailed description of the invention. The invention is described using two beams, however the invention will work with one or more beams.

Figure 2:
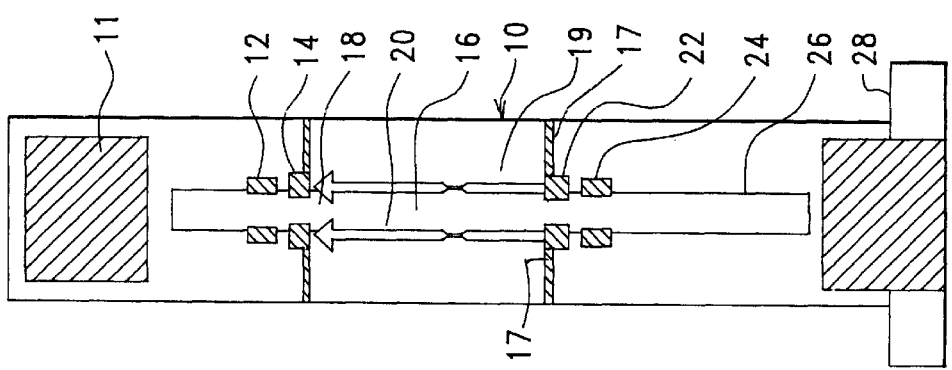
FIG. 2 is side view of the Ice Detection Probe.

FIG. 1 is a front view of the Ice Detection Probe and shows the Housing 10, Wiring Cavity 11, Beam Detector 12, Optical Filter 14, Recessed surface including a base portion 16, First side portion 17, Second side portion 18, Beam 1 19, Beam 2 20, Transparent Windows 22, Emitters 24, Heater 26, and the Attachment Plate 28. FIG. 2 is a side view of the Ice Detection Probe and shows the Housing 10, Wiring Cavity 11, Beam Detector 12, Optical Filter 14, Recessed surface base portion 16, First side portion 17, Second side portion 18, Beam 1 19, Transparent Windows 22, Emitters 24, Heater 26, and the Attachment Plate 28 The Beam 1, 19, and Beam 2, 20 at the same depth. For best results the beams are 0.02 inches above the Recessed Surface base portion 16.

Figure 4:
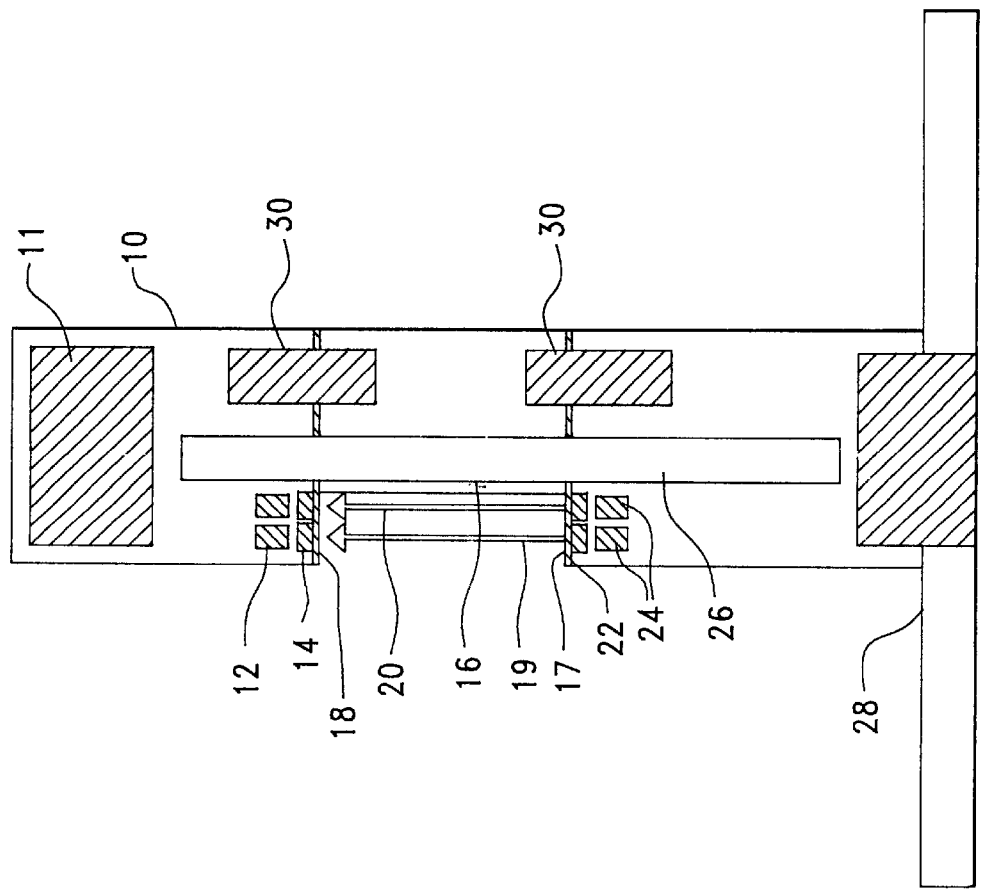
FIG. 4 is a side view of the second preferred embodiment
Figure 3:
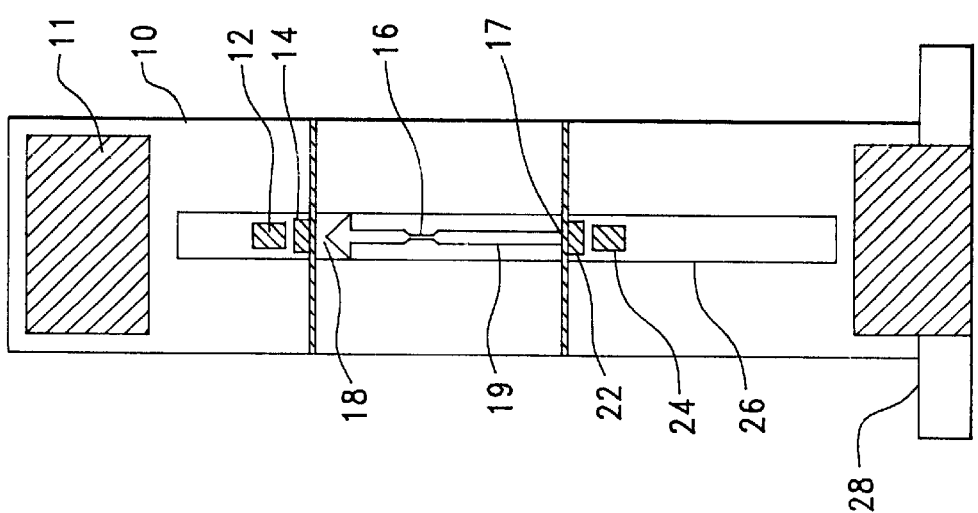
FIG. 3 is a front view of the second preferred embodiment.

FIG. 3 is a front view of the second preferred embodiment and shows the Housing 10, wiring Cavity 11, Infrared Beam Detector 12, Optical Filter 14, Recessed Surface base portion 16, First side portion 17, Second side portion 18, Beam 1 19, Transparent Windows 22, Emitters 24, Heater 26, and the Attachment Plate 28. FIG. 4 is a side view of the second preferred embodiment, and shows the Housing 10, Wiring Cavity 11, Beam Detector 12, Optical Filter 14, base portion 16, First side portion 17, Second side portion 18, Beam 1 19, Beam 2 20, FIG. 3 is a front view of the second preferred embodiment and shows the Housing 10, Wiring Cavity 11, Infrared Beam Detector 12, Optical Filter 14, Recessed Surface 16, First Wall of Recessed Surface 17, Second Wall of Recessed Surface 18, Beam 1 19, Transparent Windows 22, Emitters 24, Heater 26, and the Attachment Plate 28. FIG. 4 is a side view of the second preferred embodiment, and shows the Housing 10, Wiring Cavity 11, Beam Detector 12, Optical Filter 14, Recessed surface 16, First Wall of Recessed Surface 17, Second Wall of Recessed Surface 18, Beam 1 19, Beam 2 20, Transparent Windows 22, Beam Emitters 24, Heater 26, the Attachment Plate 28, and the Temperature Sensors 30. In this configuration, Beam 1 18, and Beam 2 20, are positioned at different depths with respect to the Recessed Surface.

Figure 5:
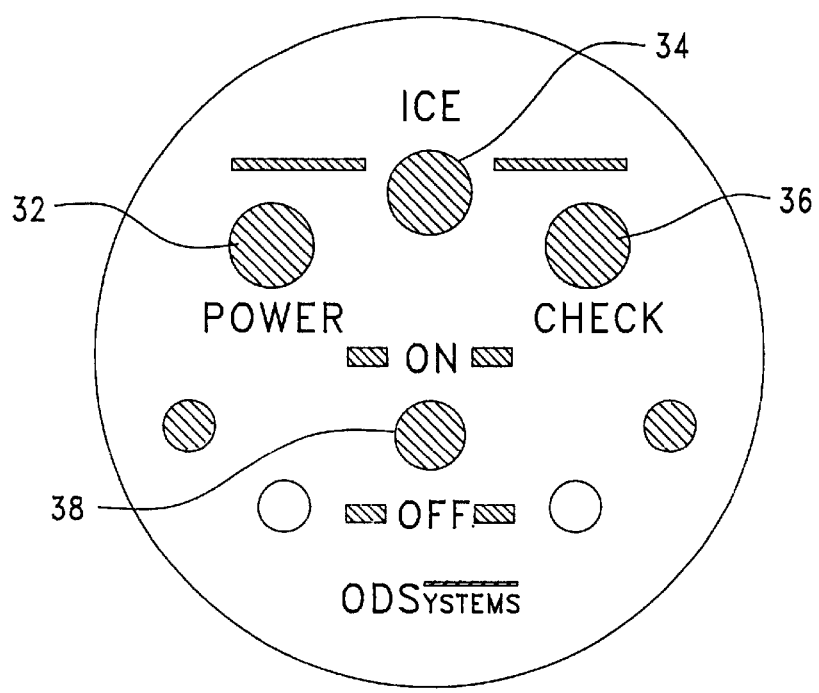
FIG. 5 is a schematic of the cockpit display unit.

The beams for both embodiments are generated by a light emitter such as a light emitting diode or laser diode and are detected by a photo-detector such as a photodiode, phototransistor or photo-darlington. Light from each emitter passes through a protective transparent optical window, and light to each photo-detector passes through a protective optical filter that isolates the photo-detector from the effects of ambient light. Each light emitter and light detector are paired, such that light from each light emitter is detected only by its corresponding photo-detector. FIG. 5 is a schematic of the cockpit display unit and shows Power On LED 32, Ice Warning LED 34, Probe Inspect LED 36, and the Power Switch 38. It is anticipated that this probe may also provide output display to an annunciator lights, interface to a data box or provide output display to a liquid crystal display.

Figure 6:
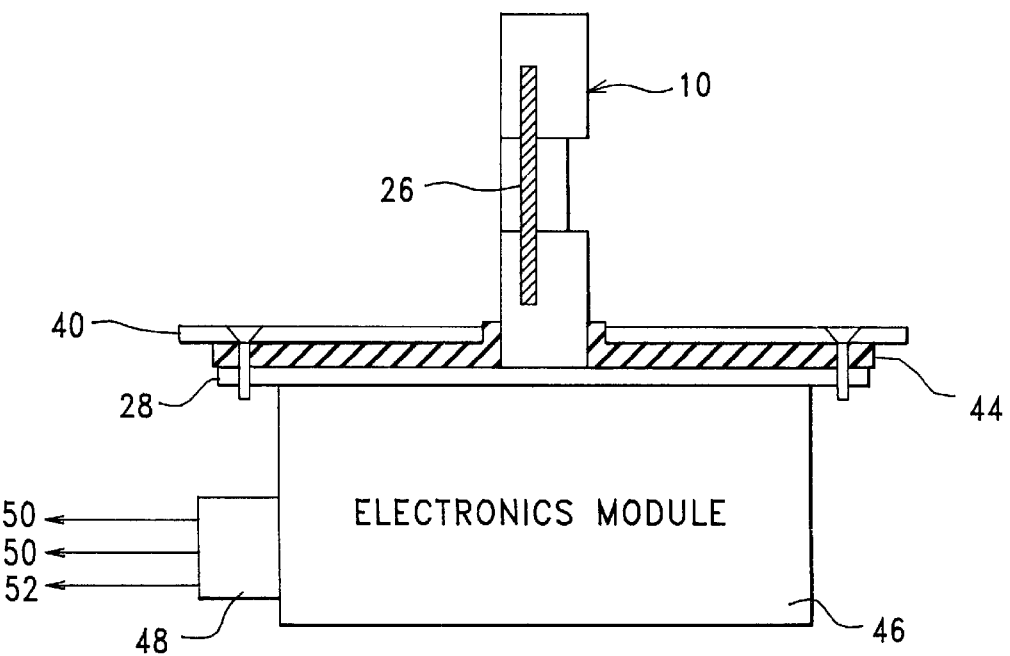
FIG. 6 is a schematic of the Integrated Ice Detection System.

FIG. 6 is a schematic of the Integrated Ice Detection System and shows the Housing 10, the Heater 26, the Aircraft Skin 40, the Attachment Plate 28, the Rubber Gasket 44, the Electronics Module 46, the Connector 48, Status Lines 50, and Power In 52. Please note that the Electronics Module 46, does not have to be positioned directly under the Housing 10. This device is an integrated product and can provide output display to an annunciator lights or a liquid crystal display and can provide output data directly to a data box.

It will now be understood that what has been disclosed herein includes a new device for detecting the presence and thickness of ice which is particularly advantageous for the aviation industry. Those having skill in the art to which the present invention relates will now, as a result of the teaching herein, perceive various modifications and additions which may be made to the invention, such as alternative shapes. Accordingly, all such modifications and additions are deemed to be within the scope of the invention which is to be limited only by the claims.

We claim:

1. A probe for detecting the presence and thickness of ice, the probe comprising:

(a) a housing having an outer surface and a recessed surface in said outer surface, said recessed surface including a base portion and first and second side portions extending away from opposite ends of said base portion;

(b) at least one beam emitter to generate a beam, said emitter is positioned to direct said beam from the first side portion of said recessed surface towards the second side portion said recessed surface; and (c) at least one beam detector, positioned to detect said beam after said beam has traveled from the first side portion of said recessed surface to the second side portion of said recessed surface.

2. A probe of claim 1, wherein the housing is a cylinder.

3. A probe of claim 1, wherein said beams have a wavelength greater than 1 micron.

4. A probe of claim 1, wherein said beam is visible light.

5. A probe of claim 1, wherein said beam is infrared light.

6. A probe of claim 1, wherein said beam is ultraviolet light.

7. A probe of claim 1, wherein said beam is a microwave.

8. A probe of claim 1, wherein said beam is position at least 0.02 inches above said recessed surface.

9. A probe of claim 1, wherein said beam is positioned at different distances with respect to said recessed surface.

10. A probe of claim 1, including at least two beams that are positioned at the same distance with respect to said recessed surface.

11. A probe of claim 1, including at least two beams that are positioned at different distances with respect to said recessed surface and at least two beams that are positioned at each of said distances.

12. A probe of claim 1, wherein each said emitter is paired with one of said detectors such that said detector can only detect a beam from said corresponding emitter.

13. A probe for detecting the presence and thickness of ice, the probe comprising:
    (a) a housing having an outer surface and a recessed surface in said outer surface, said recessed surface including a base portion and first and second side portions extending away from opposite ends of said base portion;
    (b) at least one beam emitter to generate a beam;
    (c) at least one beam guide communicating with said beam emitter to direct said beam from first side portion of said recessed surface towards the second side portion of said recessed surface; and
    (d) at least one beam detector, positioned to detect said beam after said beam has traveled between said first and second wall portions of said recessed surface.

14. A probe of claim 13, wherein said beam guide is an optical fiber.

15. A probe for detecting the presence and thickness of ice, the probe comprising:
    (a) a housing having an outer surface and a recessed surface in said outer surface, said recessed surface including a base portion and first and second side portions extending away from opposite ends of said base portion;
    (b) at least two beam emitters to generate beams;
    (c) guide means to direct said beams from said first side portion of said recessed surface towards the second side portion of said recessed surface;
    (d) at least two beam detectors, positioned to detect said beams after said beams has traveled between said first and second side portions of said recessed surface
    (e) couple means to pair each of said emitters to each of said detectors such that one of said detectors can detect beams only.

16. A probe of claim 15, wherein said couple means is alternating which of said detectors said corresponding emitters is activated, such that said detector can only detect said beams from a corresponding emitter.

17. A probe of claim 15, wherein said couple means is electronically modulating said beam from said emitter and electronically filtering said detector to detect said beam from a corresponding emitter.

18. A probe of claim 15, wherein said couple means is said emitter emitting said beams of differing wavelengths and said corresponding detectors having an optical filter, such that said detector can only detect said corresponding beam from said corresponding emitter.

19. A probe for detecting the presence and thickness of ice, the probe comprising:
    (a) a housing having an outer surface and a recessed surface in said outer surface, said recessed surface including a base portion and first and second side portions extending away from opposite ends of said base portion;
    (b) at least one beam emitter to generate a beam said emitter is positioned to direct said beam from the first side portion of said recessed surface towards the second side portion of said recessed surface;
    (c) at least one beam detector; and
    (d) a beam guide to guide said beam from the second side portion of said recessed surface to said beam detectors.

20. A probe of claim 19, wherein said beam guide is an optical fiber.

21. A probe for detecting the presence and thickness of ice, the probe comprising:
    (a) a housing having an outer surface and a recessed surface in said outer surface, said recessed surface including a base portion and first and second side portions extending away from opposite ends of said base portion;
    (b) at least one beam emitter to generate a beam, said emitter is positioned to direct said beam from the first side portion of said recessed surface towards the second side portion of said recessed surface;
    (c) at least one beam detector, positioned to detect said beam after said beam has traveled from the first side portion of said recessed surface to the second side portion of said recessed surface;
    (d) a probe heater to melt ice on said probe; and
    (e) measurement means to assess the depth of ice.

22. A probe of claim 21, wherein said measurement means is counting the number of times said probe heater is activated to melt ice on said probe.

* * * * *